A. B. THAW.
STABILIZER FOR AEROPLANES.
APPLICATION FILED JAN. 14, 1914.

1,169,695.

Patented Jan. 25, 1916.
8 SHEETS—SHEET 1.

Fig. 1.

WITNESSES

INVENTOR
ALEXANDER BLAIR THAW
BY
ATTORNEYS

A. B. THAW.
STABILIZER FOR AEROPLANES.
APPLICATION FILED JAN. 14, 1914.

1,169,695.

Patented Jan. 25, 1916.
8 SHEETS—SHEET 6.

WITNESSES

INVENTOR
ALEXANDER BLAIR THAW
BY
ATTORNEYS

UNITED STATES PATENT OFFICE.

ALEXANDER BLAIR THAW, OF PITTSBURGH, PENNSYLVANIA.

STABILIZER FOR AEROPLANES.

1,169,695.  Specification of Letters Patent.  Patented Jan. 25, 1916.

Application filed January 14, 1914. Serial No. 812,021.

*To all whom it may concern:*

Be it known that I, ALEXANDER BLAIR THAW, a citizen of the United States, and a resident of Pittsburgh, in the county of Allegheny and State of Pennsylvania, have invented a new and Improved Stabilizer for Aeroplanes, of which the following is a full, clear, and exact description.

Among the principal objects which the present invention has in view are: to provide an apparatus as characterized, operable both manually and mechanically; to provide means automatically adjustable for regulating the angle of stability; to provide means for varying the angle of stability coincident with the operation of the steering and equilibrating mechanism; to provide means for manually setting the automatic stabilizing mechanism without limiting the operation of the same; to provide an automatic mechanism adapted to operate at the beginning of movement from the adjusted plane of stability: and to provide sensitive and efficient means for inaugurating the operation of the stabilizing mechanism.

The present invention has essentially three distinct mechanisms: first, a continously-operating driving mechanism; second, an automatic mechanism for maintaining equilibrium laterally and longitudinally; and third, a mechanism operatively connected with the balancing planes of an aeroplane and adapted to be operably connected periodically with the driving mechanism by operation of the equilibrating mechanism.

The driving mechanism referred to provides a vertical shaft 25. This shaft is suitably mounted in bearings 26 and 27, adjacent the latter of which is disposed a worm 28. The thread of the worm 28 engages teeth in a worm wheel 29, which is fixedly mounted on the driving shaft 30. The prime mover with which the shaft 25 is connected may be of any suitable type adapted to drive the shaft continuously in one direction, which results in a continuous drive of the shaft 30. The shaft 30 is mounted in bearings 31 and 32 provided at the tops of standards 33 and 34.

Figure 3:
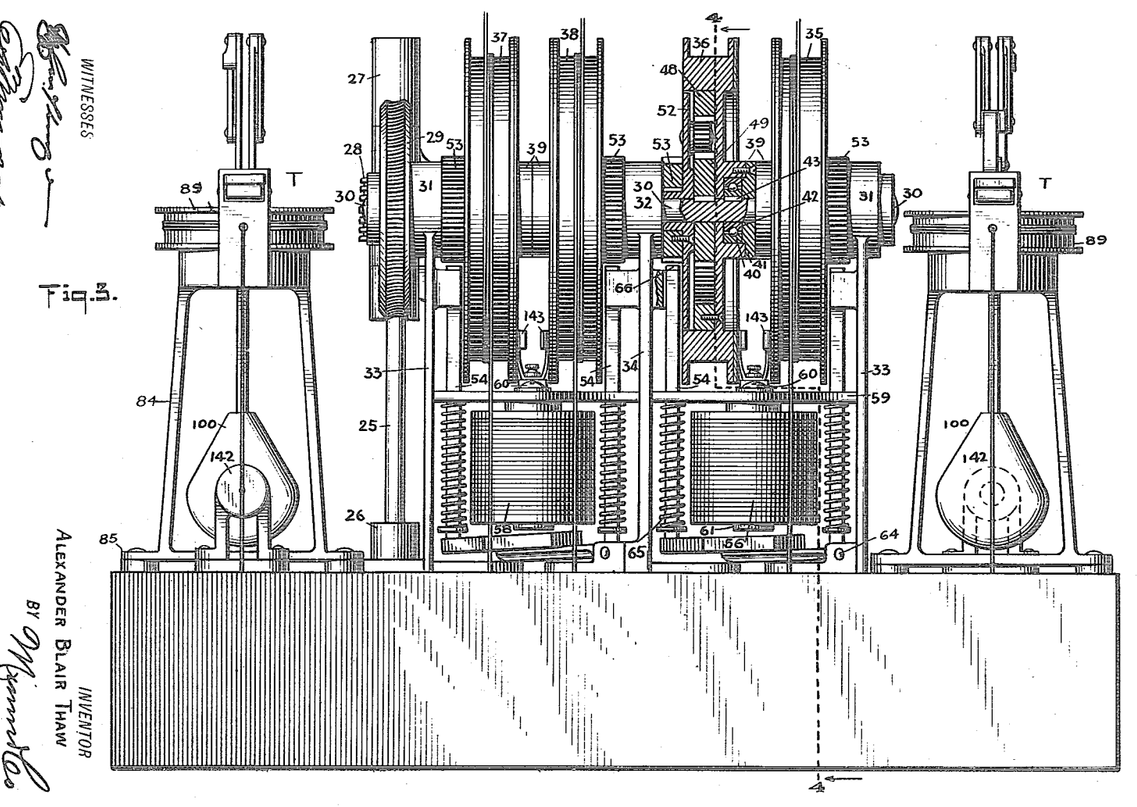
Fig. 3 is a side elevation of the same, partly in section to show the interior construction of one of the winding drums with which the stabilizer is provided, certain of the equilibrating turrets being removed to expose the arrangement of the winding drums and controlling mechanism therefor.
Figure 4:
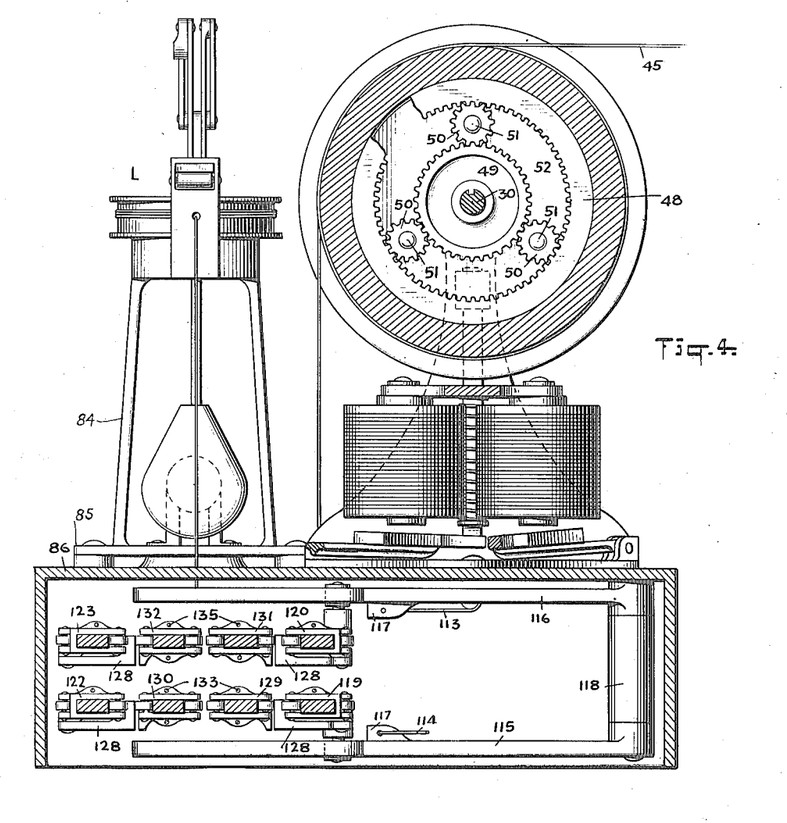
Fig. 4 is a vertical section taken on the lines 4—4 in Figs. 1 and 3.

Interposed between the bearings 31 and 32 are drums 35, 36, 37 and 38, said drums being arranged in pairs, each pair being disposed on the shaft 30 between the bearing 32 and one of the bearings 31. Each drum is recessed or hollowed at one side of the median plane, and is provided with a hub 39 extending from the opposite side. The hubs 39 of the adjacent drums form guides each for the other. Within the hubs 39 are mounted preferably ball bearings 40, the same being held in place by a cap 41, with which each hub is furnished. The inner race ring 42 of each of the ball bearings is made rigid on the shaft 30 by a key 43. Each of the drums 35, 36, 37 and 38 is attached by means of one of the cables 44, 45, 46 and 47, to one of the four balancing members; to wit, the two lateral ailerons or warping sections, and the levitating planes fore and aft. When either of the drums is operatively connected with the shaft 30, to be driven thereby, the particular balancing plane with which the cable wrapped thereon is connected, is deflected to rock the plane on one or other of its longitudinal or transverse axes. For this purpose, the drum is rigidly furnished with an internally gear-toothed ring 48, as best shown in Fig. 4 of the drawings. In coincident planes with the rings 48 are gear wheels 49 keyed to the shaft 30. Operatively connecting each wheel 49 with its corresponding ring 48, is a series of small pinions 50 mounted on stud shafts 51 set out from a circular plate 52. The plates 52 are each rotatively mounted on the shaft 30 and have a hub, keyed whereon is a ratchet wheel 53. As shown best in Fig. 3 of the drawings, the wheels 53 are each faced toward the bearings 31 and 32 of the standards 33 and 34.

It will be understood from the foregoing description and by reference to the accompanying drawings, that when the drums are held, as they normally are, by the cables 44, 45, 46 and 47, the pinions 50 are rotated by the wheels 49, causing the pinions to travel around the interior of the rings 48, and moving the plates 52 and wheels 53 connected therewith in the same rotary direction, but at a reduced speed, and this without exerting any substantial pull on said drums. When, however, the wheels 53 and plates 52 are arrested and held stationary, the pinions 50 are rotated and drive the rings 48 and drums connected therewith. This arrestation of the plates 52 is selective, each wheel 53 being engaged by one of the plungers 54, concordant with the energizing of the electro-magnets 55, 56, 57 and 58. The magnets 55 to 58 inclusive are suspended from a platform 59 extending lengthwise between the standards 33 and 34. Said magnets are suspended from said platforms by means of screws 60, as best seen in Fig. 3 of the drawings. Opposite the end of each core 61 is disposed an armature block 62, adapted for attraction by said magnets. Said armatures are each mounted upon a lever 63 pivotally mounted in lugs 64 set out from the side of each of the standards 33 and 34. Resting on the extreme end of each of the armatures 62 will be found one of the plungers 54, as best seen in Fig. 3 of the drawings. The plungers 54 are each held down upon the armature 62 by a spring 65. This function of the springs 65 also depresses the free end of each of the armature levers 62 63. The upper end of each plunger 54 has a tooth 66, adapted to engage the teeth of the wheels 53. The magnets 55, 56, 57 and 58 are supplied from a suitable electric source, not shown in the accompanying drawings. Each of said magnets is incorporated in an independent circuit. In each circuit are incorporated slide plate segments 67 and 68. Said segments are insulated from each other by a packing 69. The plate 67 is provided with a bracket 70, having an abutment shoulder to engage the free end of a rocking lever 71, which is pivotally mounted on the segment 68 and incorporated therewith in one of the operating electric circuits.

From the foregoing, it will be understood that whenever the lever 71 on one of the equilibrating turrets is rocked to engage the bracket 70 on the same turret, the corresponding one of the magnets 55, 56, 57, 58 is energized, and the armature lever 62, 63 is lifted to engage the plunger 54 operated thereby, with its corresponding wheel 53. The wheel 53 thus selected being arrested, the drum operatively connected therewith is driven to wind its respective cable and deflect the aileron, warping section or balancing plane to which it is attached. When, in the course of operation, the aeroplane rights, and the rocking lever 71 is disengaged from the bracket 70, the magnet formerly energized becomes deënergized, and the armature lever and the plunger 54 connected therewith previously lifted, drop to disengage the wheel 53 and plate 52. Said wheel and plate being thus released, the drum which has wound its respective cable is free to reverse, to pay out said cable, being moved thereto by the pressure on the plane, warping section, or aileron to which it is attached.

Figures 5, 6, 7:
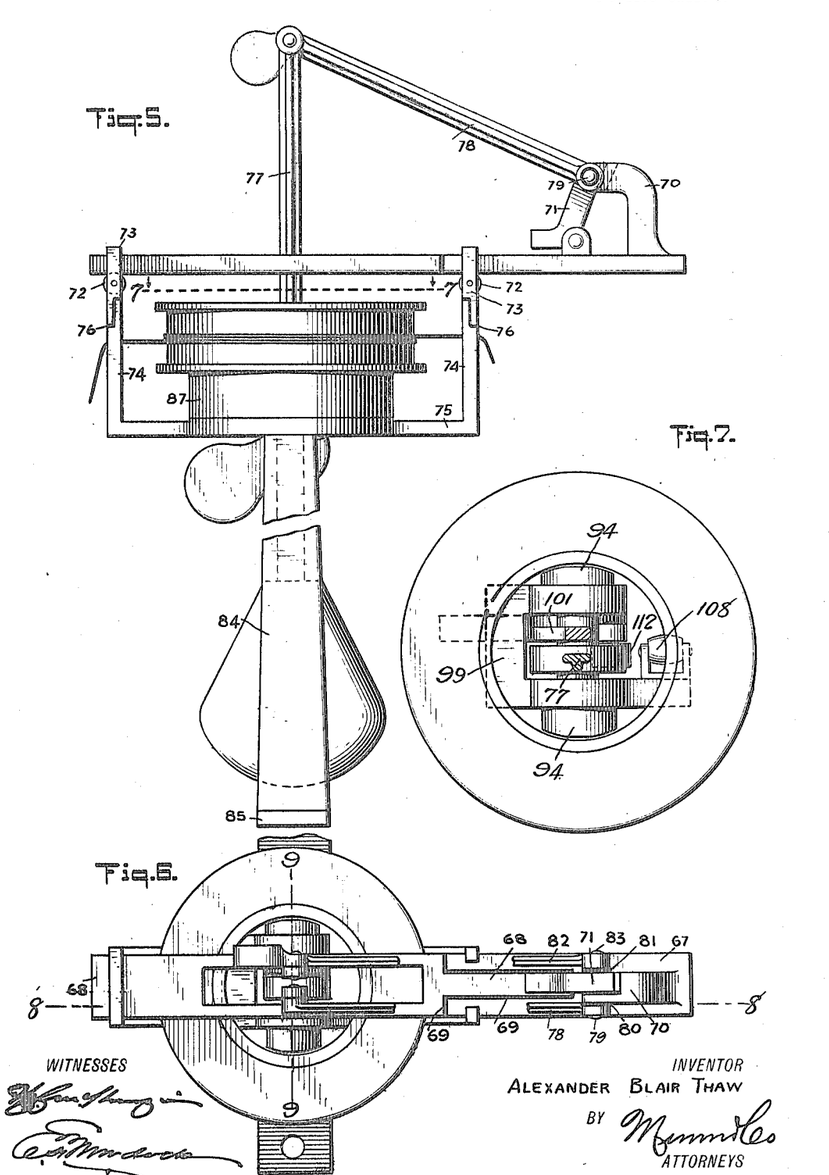
Fig. 5 is a side elevation of one of the equilibrating turrets.
Fig. 6 is a top plan view of the same.
Fig. 7 is a horizontal section, on an enlarged scale, taken on the line 7—7 in Fig. 5.

The plates formed by the segments 67 and 68 mounted on the equilibrating turrets, are each supported on rollers 72 journaled in loop arms 73, as best seen in Fig. 5 of the drawings. The loop arms 73 are supported upon the ends of the arms 74 of a frame yoke 75, and are insulated therefrom by packings 76. In this manner, the current with which the segments 67 and 68 are charged is prevented from leaking through the metal of the turrets. The plate formed by the segments 67 and 68 moves freely in the loops over the rollers 72 when operated by a plumb rod 77 and a link 78 pivotally connecting said rod and bracket 70.

To prevent the leakage of current from the segment 67 to the link 78, the pivot pin 79 connecting said link and the bracket 70, is insulated therefrom, while each is insulated from the other by a washer 80. A similar precaution is taken to insulate electrically the rocking lever 71 from the link 82, by employing a washer 81 and a suitable bushing for a pin 83 connecting said lever and link.

The yoke 75 is supported on legs 84, the feet 85 of which are bolted to the bed-plate 86 of the base of the machine. The frame 75 is centrally spread to form a circular recess for a framing cylinder 87. The cylinder 87 is provided, adjacent the upper edge, with an annular flange 88 to form a bearing for a pulley 89. The pulley 89 is provided with integral flanges 90 and 91, externally and internally extended from the web of the pulley 89. The ring 92 is removably attached to the pulley 89 and forms externally, a flange corresponding with the flange 90, the two flanges forming an annular groove for the said pulley. The flange 91 rests upon the upper edge of the cylinder 87, while the interior edge of the ring 92 extends below the flange 88, thereby holding the pulley 89 firmly in position.

Figures 10, 11, 12, 13, 14:
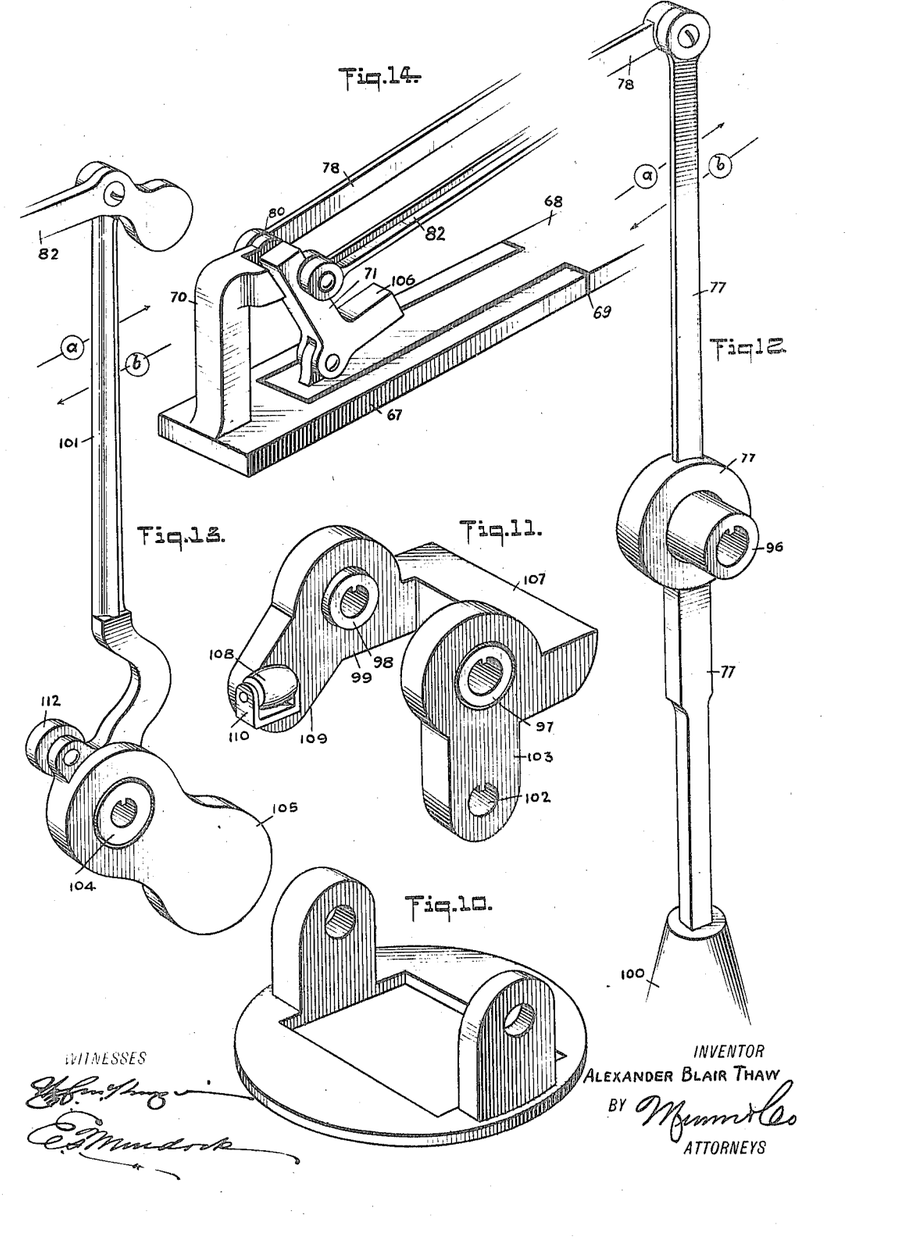
Figs. 10 to 14 inclusive are detail views in perspective of the movable parts of the equilibrating mechanism.

Seated in the bottom of the cylinder 87 is a base plate 93, upward from which extend standards 94, wherein bearings are formed for a pivot shaft 95. Centrally disposed, and pivotally mounted upon the shaft 95 is the plumb rod 77 above mentioned. Said rod is mounted on suitable ball bearings, the inner race whereof is provided with an elongated hub 96. The inner race having the hub 96 also serves as a spacing member for the inner races 97 and 98 of the ball bearings provided for a cradle 99 likewise mounted on the shaft 95. As best seen in Figs. 11 and 12 of the drawings, the races 96, 97 and 98 are each provided with keys for locking the same upon the shaft 95.

The plumb rod 77 is provided, at the lower end thereof, with a plummet 100, which normally maintains the rod 77 vertically disposed. As the riding angle of the aeroplane shifts, the rod 77, remaining vertical, moves the plate formed by the segments 67 and 68 over the rollers 72, said plate being connected, as stated, to said rod by the link 78. A second rod 101 is connected by means of a link 82, with the lever 71. This rod is pivotally mounted in a stud shaft secured in the perforation 102 formed in the pendent arm 103 of the cradle 99. The ball bearing having an inner race 104, as seen best in Fig. 13 of the drawings, is provided for pivoting the rod 101. Laterally extended from the enlargement forming the bearing for said rod 101, is a counter-weight 105, which normally exerts a backward pressure on said rod in the direction shown by the arrow $b$ in Fig. 13 of the drawings. This movement of the rod 101 is normally resisted by the lever 71, the foot 106 thereof pressing upon the segment 68. In this manner, it will be seen that if the rod 77 is rocked backward, or in the direction indicated by the arrow $a$ in Fig. 12 of the drawings, the rod 101 will move therewith in parallel relation, if permitted, and the center of the pivot for the rod 101, which is the center of the perforation 102 in the cradle 99, will swing in correspondence until said cradle is arrested. The movement of the rod 77 in the direction indicated by the arrow $b$ in Fig. 12, moves the plate formed by the segments 67 and 68 and the lever 71 therewith, the foot 106 whereof restrains the movement thereof and thereby holds the rods 77 and 101 in parallel relation and avoids contact between said lever and said foot. In this manner provision is made for the swing of the rods 77 and 101 to the opposite side of a line perpendicular to the horizontal plane of the aeroplane from that on which the declination or dip is corrected, without stabilizing operative effect. Thus the angle of stabilization may be widely varied while preserving the operating moment.

Figures 8, 9:
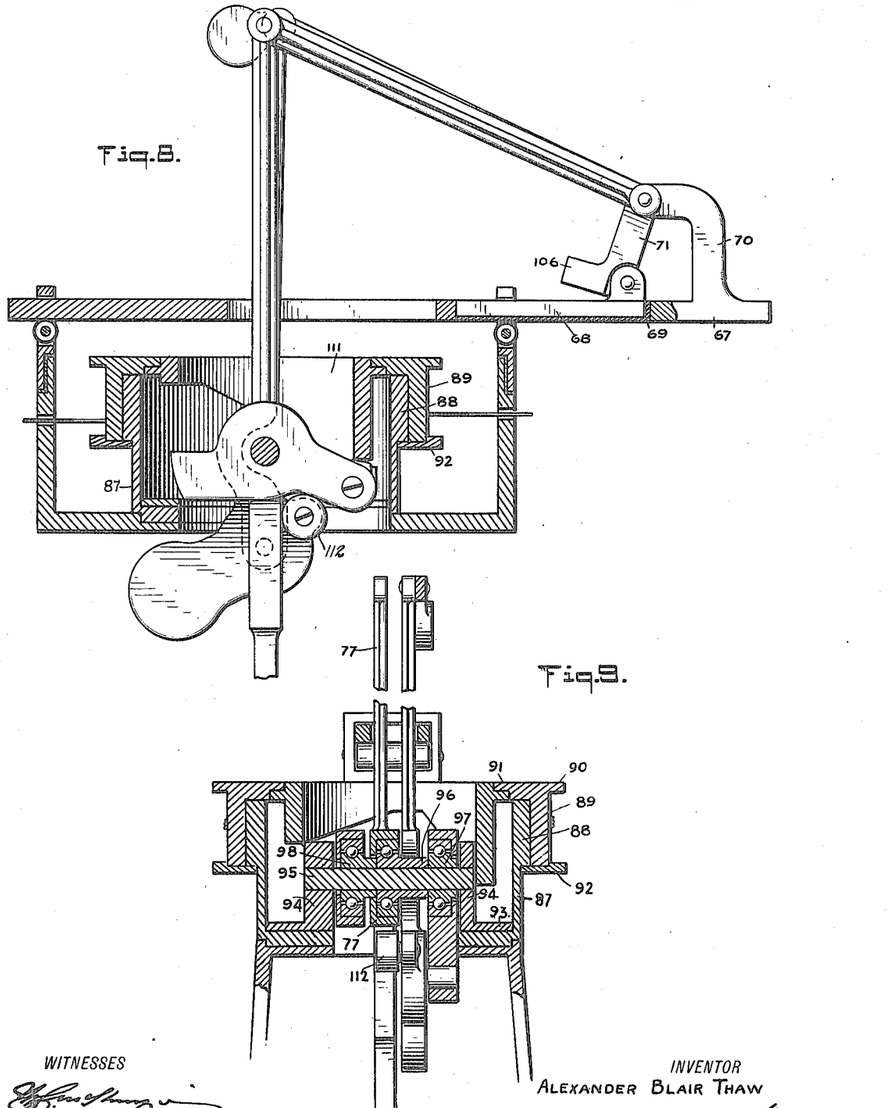
Fig. 8 is a vertical section on an enlarged scale, taken as on the line 8—8 in Fig. 6.
Fig. 9 is a vertical cross section on an enlarged scale, taken as on the line 9—9 in Fig. 6.

The cradle 99 is provided with a weighted cross bar 107. The cross bar 107 normally rocks said cradle on the shaft 95, to lift the end of an arm 109 and the roller 108 mounted thereon. The roller 108 is mounted in bracketed bearings 110, as shown best in Fig. 11 of the drawings. The axis of said roller is radial to a cylindrical cam 111, which is rigidly secured to and concentric with the pulley 89. The roller 108 is slightly crowned to track on the lower edge of the cam 111, as shown best in Fig. 8 of the drawings. Thus it will be seen that the function of the weighted cross bar 107 is to maintain the roller 108 on the cradle 99 continuously pressing upon the lower edge of the cam 111.

Set out from the side of the bearing of the rod 101 is a roller 112. Said roller extends into the path of the lower section of the rod 77, as shown best in Fig. 9 of the drawings, and receives the impact of said rod when the aeroplane is tilted to relatively move the rod 77 as in the direction indicated by the arrow $a$ in Fig. 12. Any pressure now applied by the rod 77 upon the roller 112 tends to rock the rod 101 and the counter-weight 105 thereof on its pivot, or the center of the perforation 102 in the end of the arm 103. This action produces a movement of the rod 101 in the direction indicated by the arrow $b$ in Fig. 13, while the upper portion of the rod 77 relatively moves in the direction indicated by the arrow $a$ in Fig. 12 of the drawings. This is the action produced when the aeroplane tilts beyond the stabilizing angle. The immediate result of the relatively opposite movements of the upper ends of the rods 77 and 101 is to draw the plate formed by the segments 67 and 68 and the bracket 70 in the direction followed by the rod 77, while the rod 101, through the link 82, moves the upper extension of the lever 71 in the direction in which it is traveling, or as indicated by the letter $b$ in Fig. 13 of the drawings. The contact surfaces of the bracket 70 and the lever 71 are thus brought together, and the electric circuit incorporating said bracket, said lever and one of the magnets 55, 56, 57, 58, is completed. The magnet being thus energized, inaugurates the operation of one of the drums 35, 36, 37 or 38, as the case may be.

It will be noted that the distance between the pivot of the rod 77 and the point of connection of the same with the link 78 is several times greater than the distance between the pivot of the rod 101 and the point of contact of the roller 112 with the rod 77. As a consequence of this arrangement, a slight movement of the roller 112 produces a relatively large movement at the upper end of the rod 101. As the limit of movement of the arms 77 and 101 in opposite directions is determined by the space separating the contact surfaces of the bracket 70 and the lever 71, this space, when divided by the distance above noted, shows an exceedingly small permitted angle of deflection for the aeroplane from the angle of stability, prior to the actuation of the balancing planes.

Figures 15, 16, 17:
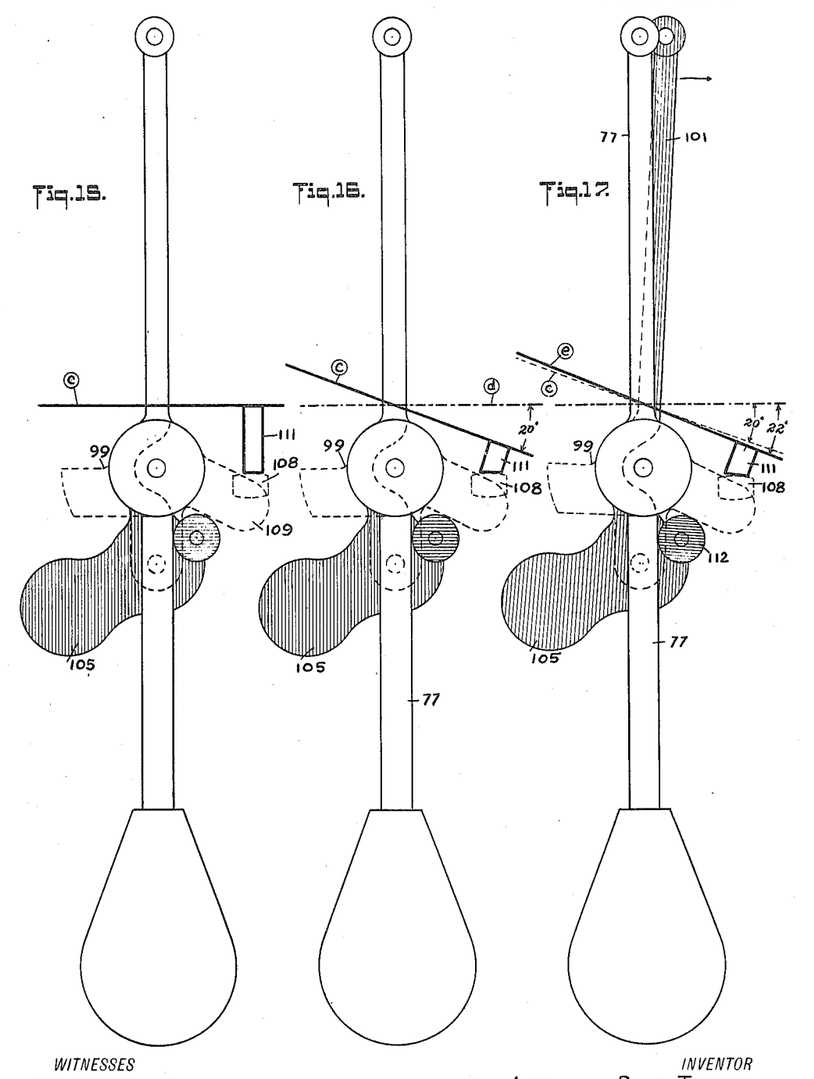
Figs. 15 to 17 inclusive are detail views showing the relative positions of the equilibrating mechanism and the aeroplane, when flying in a straight line, when flying on a curve, and when deflected from the adjusted angle of stability.

The angle of stability above referred to is mechanically predetermined, the cams 111 being employed for this purpose. The cams 111, as above described, are mounted upon the pulleys 89, one of which is provided on each of the equilibrating turrets. In Figs. 15, 16 and 17, the arrangement and effect of the cams with and upon the cradle 99 and parts connected therewith, are shown progressively.

Fig. 15 shows diagrammatically the arrangement of the cam 111 as engaging the roller 108 on the arm 109 of the cradle when the angle of stability is zero, the craft being represented by the line $c$, as horizontal.

In Fig. 16, the angle of stability has been set at 20° from the horizontal which is indicated by the dotted line $d$, the cam 111 having been rotated until a narrow portion of the wall is superposed above and in contact with the roller 108. It will be noted that in Fig. 16, the cradle 99 and parts connected therewith have the same inactive or alert position as shown in Fig. 15 of the drawings. The cam 111 has been rotated from the position indicated in Fig. 15 to that indicated in Fig. 16, in correspondence with the operation of the steering or levitating mechanism of the aeroplane on which the stabilizer is mounted, as hereinafter described.

In Fig. 17, it has been assumed that the aeroplane has been accidentally deflected from the plane of stability $c$ to a plane $e$, which is 2° in excess of the set angle, or what is termed the angle of stability, shown in Fig. 16. It will be noted that by the downward movement of the cam 111 the 2° above referred to, the cradle 99 and parts connected therewith have been moved in the manner above described, with the result that the rod 101 and the counterweight 105 thereof have been rotated about their pivot by the depression of the wheel 112, due to the pressure exerted thereon by the resistance on the lower section of the plumb rod 77.

It will be noted that the separation of the rods 77 and 101 at the upper ends thereof, is in excess of the permitted travel. This exaggeration has been employed to more clearly show the action of the parts connected, which in practice is so slight as to be almost undistinguishable. It will also be understood that while the active or operative relation of the rods 77 and 101 as shown in Fig. 17, relates to the condition established in Fig. 16, the same action would result from a similar deflection of the aeroplane when in the position indicated in Fig. 15. The result of the separating action of the rods 77 and 101 in the manner shown in Fig. 17, has been above described as producing the electrical contact between the bracket 70 and the rocking lever 71.

Figure 1:
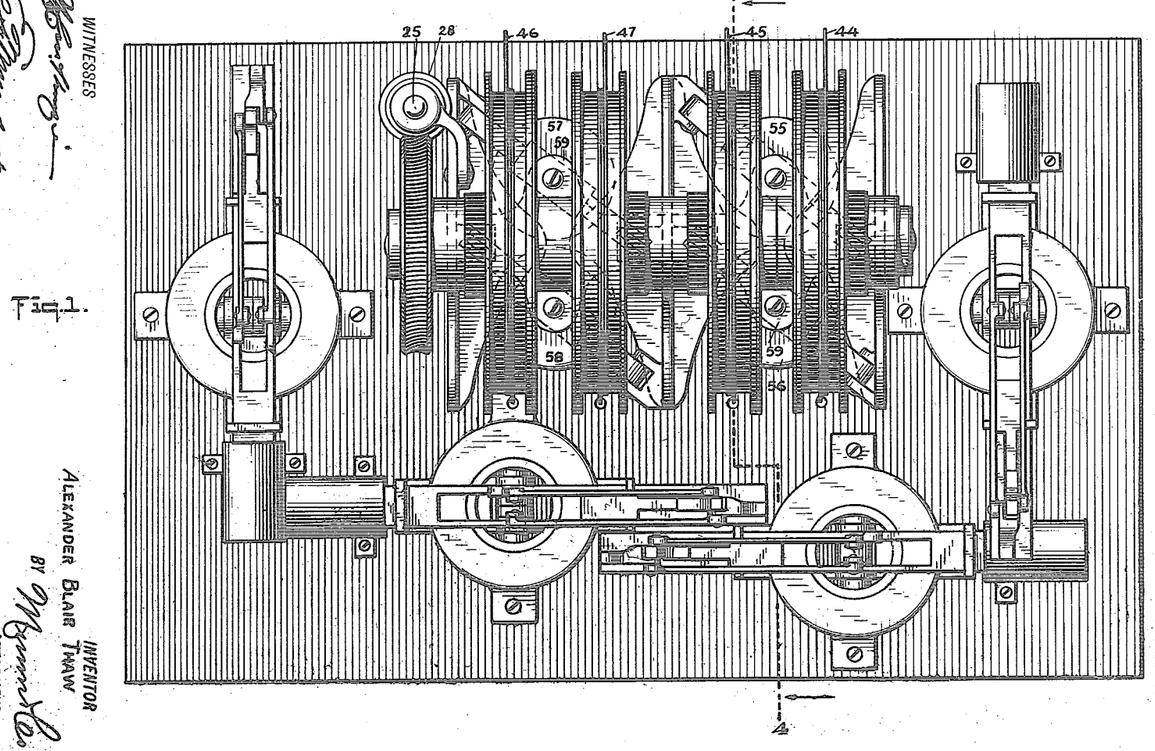
Figure 1 is a top plan view of a stabilizer constructed and arranged in accordance with the present invention.
Figure 2:
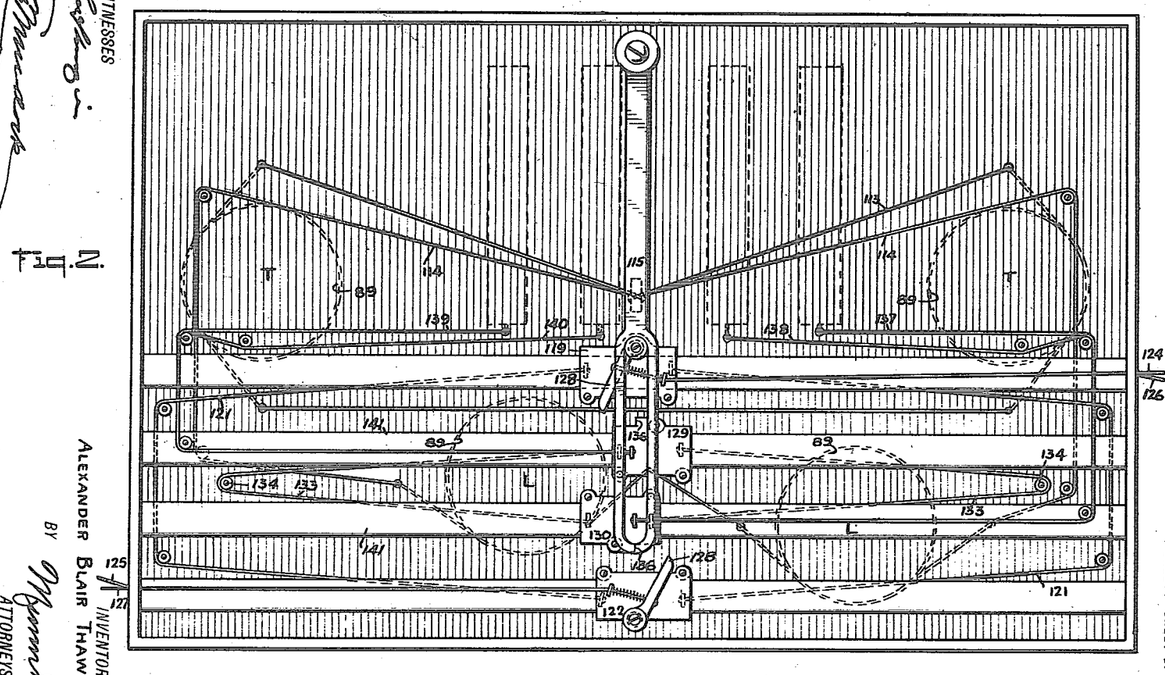
Fig. 2 is a bottom plan view of the same.

The cams 111, as shown best in Fig. 2 of the drawings, are coupled or operated in pairs. Two said cams are employed to set the transverse angle of stability, while the other two are employed to set the longitudinal angle of stability. Further, for convenience, said cams, or the pulleys 89 connected therewith, are attached to or controlled by the manually operative steering or balancing mechanism of the aeroplane. For this purpose, the pulleys 89 are connected in pairs by short, endless cables 113 and 114. The cable 114 is employed to operatively connect the pulleys 89 at the stations L, shown in the drawings to indicate the turrets or stations therefor controlling the transverse or lateral ailerons. The cable 113 operatively connects the pulleys 89 at the stations marked T, which marking is used to indicate the turrets or mechanism controlling the longitudinal stability or levitating planes fore and aft of the aeroplane. The cable 114 is made fast to a lever 115, while the cable 113 is similarly attached to a corresponding lever 116, as best shown in Fig. 2 and Fig. 4 of the drawings. Said levers are each provided with a lug 117 for attaching said cables. From the foregoing it will be understood that as the levers 115 or 116 are rocked on their pivot 118, the cables 114 or 113 are moved to rotate the pulleys at the stations L, L or T, T, respectively. The levers 115 and 116 are controlled by carriages 119 and 120, respectively. The carriages 119 and 120 are operatively connected by a continuous cable 121, with carriages 122 and 123, to be moved in unison therewith. Each of the carriages 119, 120, 122 and 123, is connected with one of the manually-controlled cables 124, 125, 126 and 127, which cables are arranged in pairs, two passing to the mechanism of the aeroplane, for controlling the ailerons and the transverse or lateral stability, and two being connected with the mechanism of the aileron for controlling the longitudinal stability thereof. Each of said cables is primarily connected with a trip arm 128, which is pivotally mounted on said carriages and arranged to swing outward to engage four auxiliary carriages 129, 130, 131 and 132. The carriages 129 and 130 are connected in pairs by endless looped cables 133, which are passed around pulleys 134, as best shown in Fig. 2 of the drawings. A similar arrangement is provided for the carriages 131 and 132, which are operatively connected by the cables 135. Each of the carriages 129 to 132 inclusive is provided with an extended shoulder 136, which shoulders are engaged by the trip arms 128 adjacent and in line therewith, when the same are drawn upon by the manually-controlled cables 124, 125, 126 and 127.

From the foregoing it will be understood that the cables 124, 125, 126 and 127 are drawn on selectively, and that as selected and drawn, the trip arm 128 corresponding is moved into engagement with a shoulder 136 of one of the carriages 129, 130, 131, 132, to thereafter move said carriage which is engaged, to the limit of the movement of the selected cable.

As above noted, the cables 44, 45, 46 and 47 operatively connect the aeroplane balancing members and the drums 35, 36, 37 and 38. These drums are in turn connected by means of cables 137, 138, 139 and 140, with the carriages 129, 130, 131 and 132, respectively. Thus, it will be seen that as the selected cable 124, 125, 126 or 127 is drawn upon, the corresponding trip arm 128 engages the corresponding one of said carriages and moves it along one of the track bars 141 to the limit of the movement of the selected cable and the carriage 119, 120, 122, 123, actuated thereby.

From the foregoing, it will be noted that the manual controls or cables operate the balancing members of the aeroplane through the drums of the stabilizer. It will also be noticed that the cams 111 at the stations corresponding with the affected balancing members are rotated by the cables 113, 114, to set or provide a corresponding angle of stability. It will also be noticed that while the manual controls affect the movement of the carriages 129, 130, 131 and 132, said carriages are not restrained from a further action when automatically produced by accidental or unintentional deflection of the aeroplane beyond the fixed or adjusted angle of stability. To illustrate the foregoing, assume that the carriage 130 is moved by the carriage 122 and the trip arm 128 thereon to the left of the position shown in Fig. 2 of the drawings, a distance manually controlled by drawing upon the cable 127. Said carriage would be permitted still further travel if, by reason of the up-tilting of the plane as shown in Fig. 17 of the drawings, the electric contact above described between the bracket 70 and the rocking lever 71 is effected, and the electric circuit energizing one of the magnets 55, 56, 57, 58, be thereby completed to energize the same and lift the corresponding plunger 54 to cause one of the corresponding drums 35, 36, 37, 38 to rotate with the shaft 30.

From the foregoing, it will be seen that an aeroplane equipped with a stabilizer constructed and arranged as described, is manually controlled not alone to balance the aeroplane, but to coincidentally adjust the automatic stabilizing mechanism to maintain the angle of stability to which the areoplane is naturally moved by the manual operation of said controlling mechanism, to be thereafter maintained at the stabilized angle by said automatic mechanism.

To quiet the action of the plummets 100, I provide a series of pneumatic dash-pots 142. The rapidity of action of the dash-pots may be regulated by the size of the air-escape provided therein.

It will be understood that the running of the wires between the electric source or supply and the segments 67 and 68 forming the various operating circuits, may be variously arranged. For this reason, I have not undertaken to show in the drawings any specified arrangement. In any event, however, the various operating circuits will include, each, one of the contact wipers 143, which normally bears against the sides of the adjacent drums. Each of said drums is provided with an insulating section to pass under the wiper 143 when the drum has made one complete revolution, such being the limit of its movement. When the insulating section passes under the wiper, the circuit energizing the magnet operating the drum, is broken, and the magnet deënergized, with the result that the pull of the balancing member on the same retracts the drum until the exposed or electrical contacting portion thereof again engages said wiper. By this means, any tendency of over-operation of the drums is corrected.

Claims:

1. A stabilizer as characterized, having a continuously operating driving shaft; a plurality of winding drums operatively mounted thereon; a plurality of cables adapted to be connected to balancing members of an aeroplane; a plurality of cables arranged for manual manipulation, each of said cables having correspondence with one of the above-mentioned drums; and a plurality of engaging members interposed between said drums and manually-manipulated cables, to rotate said drums in correspondence with the manipulation of said second-mentioned cables, to wind said first-mentioned cables, said engaging members being adapted for disengagement when said shaft and said drums are engaged.

2. A stabilizer as characterized, having a continuously driven shaft; a plurality of winding drums rotatively mounted on said shaft; means for temporarily operatively connecting said shaft and said drums, embodying wheels fixedly mounted on said shaft in juxtaposed relation to said drums; driving surfaces, one on each of said drums in corresponding relation to said wheels; rotary members continuously connecting said wheels and surfaces, to travel about said wheels when said drums are stationary; and means to arrest the travel of said members to rotate said drums.

3. A stabilizer as characterized, having a continuously driven shaft; a plurality of winding drums rotatively mounted on said shaft; means for temporarily operatively connecting said shaft and said drums, embodying wheels fixedly mounted on said shaft in juxtaposed relation to said drums; driving surfaces, one on each of said drums in corresponding relation to said wheels; rotary members continuously connecting said wheels and surfaces, to travel about said wheels when said drums are stationary; and means for arresting the travel of said rotary members, said means embodying an electro-magnet, an engaging member to hold said rotary members; and a gravity-actuated pawl for completing the electric circuit through said magnet.

4. A stabilizer as characterized, having a continuously driven shaft; a plurality of cable winding drums rotatively mounted on said shaft and operatively connected with the balancing planes of an aeroplane; means for temporarily engaging said shaft and drums, embodying gear wheels fixedly mounted on said shaft, one juxtaposed to each of said drums, internally gear-toothed rings, one mounted on each of said drums in a plane coincident with said wheels and spaced apart therefrom, a plurality of frames, each rotatively mounted in juxtaposed relation to one of said wheels and its corresponding ring, and a plurality of pinions mounted on said frames, operatively engaging said wheels and said rings; and means for automatically arresting said frames to rotate said drums.

5. A stabilizer as characterized, having a continuously driven shaft; a plurality of cable winding drums rotatively mounted on said shaft and operatively connected with the balancing planes of an aeroplane; means for temporarily engaging said shaft and said drums, embodying gear wheels fixedly mounted on said shaft, one juxtaposed to each of said drums, internally gear-toothed rings, one mounted on each of said drums in a plane coincident with said wheels and spaced apart therefrom, a plurality of frames, each rotatively mounted in juxtaposed relation to one of said wheels and its corresponding ring, and a plurality of pinions mounted on said frames, operatively engaging said wheels and said rings; and a plurality of mechanisms for arresting said frames, embodying each an electro-magnet and a gravity-closed normally-open electric circuit therefor.

6. A stabilizer as characterized, having a continuously driven shaft; a plurality of cable winding drums rotatively mounted on said shaft and operatively connected with the balancing planes of an aeroplane; means for temporarily engaging said shaft and said drums, embodying gear wheels fixedly mounted on said shaft, one juxtaposed to each of said drums, internally gear-toothed rings, one mounted on each of said drums in a plane coincident with said wheels and spaced apart therefrom, a plurality of frames, each rotatively mounted in juxtaposed relation to one of said wheels and its corresponding ring, and a plurality of pinions mounted on said frames, operatively engaging said wheels and said rings; a plurality of mechanisms for arresting said frames, embodying each an electro-magnet and a gravity-closed normally-open electric circuit therefor; and a plurality of gravity-actuated means for closing said circuits, embodying a plurality of plummets for operating said means, said plummets being each adapted to operate when swung from the vertical plane in one direction only.

7. A stabilizer as characterized, having a continuously driven shaft; a plurality of winding drums rotatively mounted thereon and operatively connected each with one of the balancing members of an aeroplane; transmission mechanism for temporarily operatively connecting said shaft and said drums; electro-mechanical clutch mechanisms, each embodying an electro-magnet and a normally-open electric circuit therefor; a movable switch member for said circuit; a plummet operatively connected with said switch member; and transmission means interposed between said switch member and said plummet for multiplying the extent of the movement thereof for obtaining relatively enlarged movements of said switch.

8. A stabilizer as characterized, having a continuously driven shaft; a plurality of winding drums rotatively mounted thereon and operatively connected each with one of the balancing members of an aeroplane; transmission mechanism for temporarily operatively connecting said shaft and said drums; electro-mechanical clutch mechanisms, each embodying an electro-magnet and a normally-open electric circuit therefor; a movable switch member for said circuit; a plummet operatively connected with said switch member; and transmission means interposed between said switch member and said plummet for augmenting the extent of the movement thereof for obtaining relatively enlarged movements of said switch, said means embodying a plurality of rocking levers, one of said levers being provided with a relatively short arm extended into the path of the other of said levers.

9. A stabilizer as characterized, having a continuously driven shaft; a plurality of winding drums rotatively mounted on said shaft, each of said drums being operatively connected with one of the balancing members of an aeroplane; a plurality of transmission mechanisms operable to temporarily connect each of said drums with said shaft; a plurality of electro-mechanical means for controlling said transmission mechanisms, each of said means embodying a gravity-controlled plumbing member to close the operating circuit of said electro-mechanical means, and a rotary cam for controlling the circuit-closing operation of said plumbing member; manually controlled means for operating said balancing members of the aeroplane; and transmission means for connecting said manually-controlled means with said drums and said cams, to operate the same in unison therewith.

10. A stabilizer as characterized comprising a mechanism for maintaining an aeroplane in its plane of flight; means for controlling the operation thereof, said means embodying a plurality of pendulous, actuating members; and means for preventing relative movement of said members at one side of the vertical plane perpendicular to the plane of oscillation of said members.

In testimony whereof I have signed my name to this specification in the presence of two subscribing witnesses.

ALEXANDER BLAIR THAW.

Witnesses:
 E. F. MURDOCK,
 WILLIAM SCHUCKAR.